United States Patent [19]
Tomiyama

[11] Patent Number: 5,500,771
[45] Date of Patent: Mar. 19, 1996

[54] BIAXIAL ACTUATOR FOR OPTICAL PICKUP

[75] Inventor: Takamichi Tomiyama, Chiba, Japan

[73] Assignee: Sony Corporation, Tokyo, Japan

[21] Appl. No.: 208,834

[22] Filed: Mar. 11, 1994

[30] Foreign Application Priority Data

Mar. 23, 1993 [JP] Japan .................................. 5-088101

[51] Int. Cl.⁶ .................................................. G02B 7/02
[52] U.S. Cl. ..................... 359/813; 359/823; 369/44.15
[58] Field of Search ................................... 359/813, 814, 359/823, 824; 369/44.15, 44.16

[56] References Cited

U.S. PATENT DOCUMENTS

| | | | |
|---|---|---|---|
| 4,669,823 | 6/1987 | Iguma et al. ............................ | 359/824 |
| 4,991,161 | 2/1991 | Ikegame et al. ...................... | 369/44.15 |
| 5,018,836 | 5/1991 | Noda et al. ............................. | 359/824 |
| 5,056,891 | 10/1991 | Masunaga ............................... | 359/813 |
| 5,208,703 | 5/1993 | Ikegame et al. ....................... | 359/813 |

FOREIGN PATENT DOCUMENTS 0516390  12/1992  European Pat. Off. .

OTHER PUBLICATIONS

Patent Abstracts of Japan, Pub. No. JP1072338, vol. 13, No. 291, Pioneer Electronic Corp, Patent Date: Mar. 17, 1989, Inventor—Ishii Sekio.
Patent Abstracts of Japan, Pub. No. JP3073426, vol. 15, No. 237, Olympus Optical Co. Ltd., Patent Date: Mar. 28, 1991, Inventor, Ikegame Tetsuo et al.
Patent Abstracts of Japan, Pub. No. JP3173941, vol. 15, No. 424, Mitsubishi Electric Corp., Patent Date: Jul. 29, 1991, Inventor—Matosaki Toshiya.

*Primary Examiner*—Loha Ben
*Attorney, Agent, or Firm*—Ronald P. Kananen

[57] ABSTRACT

A biaxial actuator for an optical pickup, including a lens holder for supporting an objective lens, a coil bobbin mounted on the lens holder, a focusing coil and a tracking coil both wound around the coil bobbin, and a supporting portion for supporting the lens holder through elastic members. The lens holder and the supporting portion to be fixedly mounted to a fixed member are integrally formed with the elastic members. The coil bobbin has terminal pins around which wire ends of the focusing coil and the tracking coil are wound, and the terminal pins are directly connected to the elastic members.

19 Claims, 2 Drawing Sheets

BIAXIAL ACTUATOR FOR OPTICAL PICKUP

BACKGROUND OF THE INVENTION

The present invention relates to a biaxial actuator for an optical pickup to be used in recording or reproducing a signal to or from an information recording medium.

Such a biaxial actuator for an optical pickup in the prior art is used to record or reproduce a signal to or from an information recording medium such as an optical disk. The biaxial actuator is so designed as to move an objective lens provided on a supporting member in two directions, i.e., a focusing direction and a tracking direction.

FIG. 1 shows an example of such a conventional biaxial actuator. Referring to FIG. 1, reference numeral 1 generally designates the biaxial actuator. The biaxial actuator 1 includes a lens holder 2 and a coil bobbin 3 mounted on the lens holder 2 by adhesive or the like.

The lens holder 2 is movably supported to a base member (not shown) by wires 4 connected to the base member under tension in such a manner that the lens holder 2 can be moved in two directions perpendicular to the wires 4, i.e., in a tracking direction shown by an arrow A and a focusing direction shown by an arrow B.

A focusing coil and a tracking coil are wound around the coil bobbin 3. Wire ends of the coils are wound around four terminal pins 3a projecting from a side surface of the coil bobbin 3.

In the biaxial actuator 1 thus constructed, the wiring of the coils wound around the coil bobbin 3 is effected by winding first ends of litz wires 5 around the terminal pins 3a and connecting second ends of the litz wires 5 to terminals provided on the base member.

Thus, a driving voltage is supplied from the terminals of the base member through the litz wires 5 to the coils, thereby moving the coil bobbin 3 in the directions A and B. Accordingly, an objective lens (not shown) mounted on the lens holder 2 is suitably moved in the focusing direction and the tracking direction.

However, in the conventional biaxial actuator 1 mentioned above, the wiring of the coils to the base member includes the connection of the litz wires 5 between the terminal pins 3a of the coil bobbin 3 and the terminals of the base member.

That is, it is necessary to perform a work of winding the litz wires 5 around the terminal pins 3a and a work of soldering the litz wires 5 to the terminal pins 3a. Accordingly, the workability is reduced to increase an assembly cost, and there is a possibility of disconnection of the litz wires 5.

SUMMARY OF THE INVENTION

It is accordingly an object of the present invention to provide a biaxial actuator in which the wiring of the coils wound around the coil bobbin can be easily performed, and the assembly can be automated.

According to the present invention, there is provided an objective lens driving actuator for moving an objective lens in a focusing direction and a tracking direction relative to a recording medium, comprising a movable portion for holding said objective lens; a coil bobbin mounted on said movable portion and supporting a focusing coil and a tracking coil wound therearound, said coil bobbin having a plurality of terminal pins to which wire ends of said focusing coil and said tracking coil are connected; a plurality of elastic members for movably supporting said movable portion, said elastic members having first ends mounted to said movable portion to supply power to said focusing coil and said tracking coil, said terminal pins of said coil bobbin being directly connected to said elastic members; and a supporting portion for fixedly supporting second ends of said elastic members to a fixed member.

Preferably, the elastic members comprise leaf springs. More preferably, the leaf springs have area enlarged portions to which the terminal pins are connected. Further, the movable portion and the supporting portion are integrally formed with the elastic members by outsert molding.

With this construction, the coils wound around the coil bobbin are directly electrically connected from the terminal pins of the coil bobbin through the elastic members to the supporting portion to be fixedly mounted to the fixed member. Thus, a driving voltage is supplied from the fixed member through the elastic members to the coils.

In the case where the elastic members comprise leaf springs, and the portions of the leaf springs to which the terminal pins of the coil bobbin are connected are enlarged in area, the terminal pins can be easily soldered to the elastic members.

Further, in the case where the lens holder and the supporting portion to be fixedly mounted to the fixed member are integrally formed with the elastic members by outsert molding, all the elastic members, the lens holder, and the supporting portion can be easily assembled by a single molding step.

Other objects and features of the invention will be more fully understood from the following detailed description and appended claims when taken with the accompanying drawings.

DETAILED DESCRIPTION OF THE PREFERRED EMBODIMENT

A preferred embodiment of the present invention will now be described in detail with reference to FIGS. 2 and 3.

The embodiment to be described below is a preferred embodiment of the present invention, and so it includes various limitations technically preferred. However, the scope of the present invention is not limited to the preferred embodiment unless otherwise specified in the following description.

Figure 1:
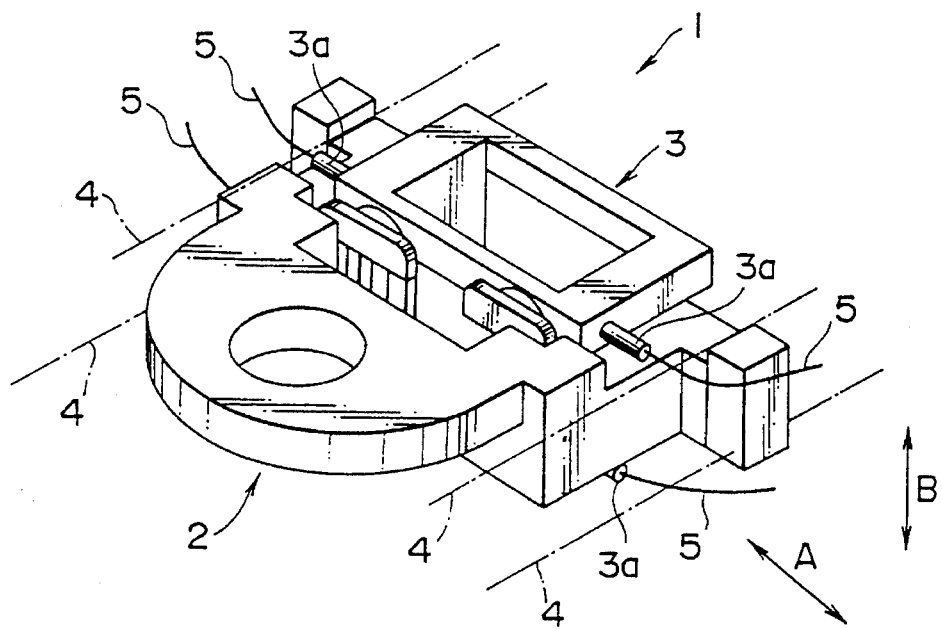
FIG. 1 is a schematic perspective view of a conventional biaxial actuator for an optical pickup.
Figure 2:
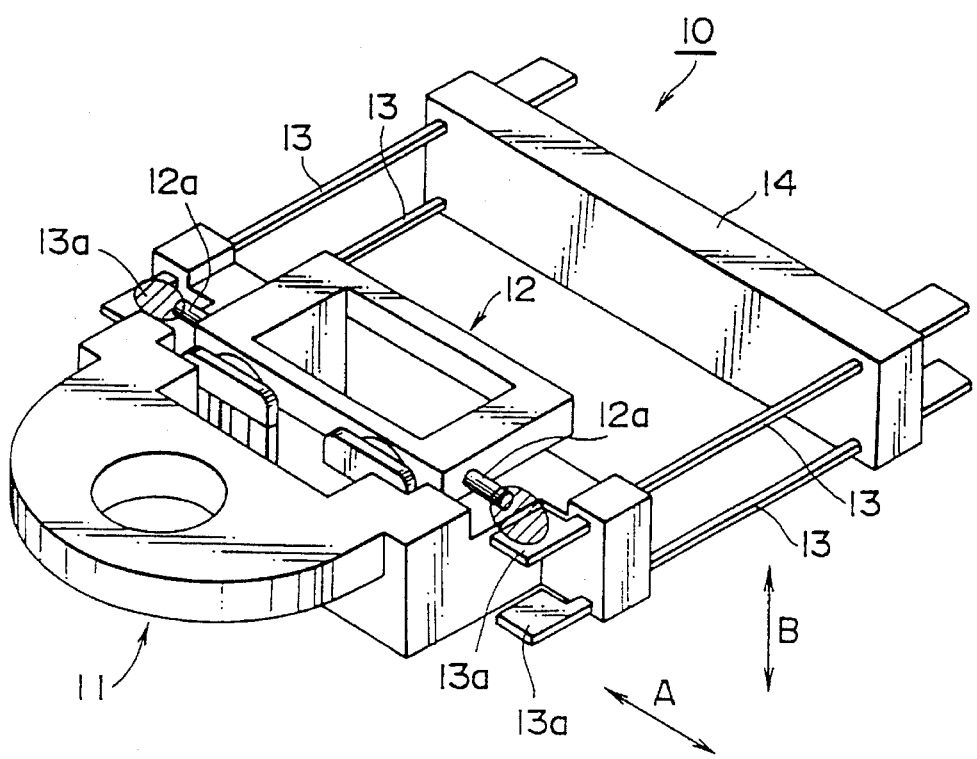
FIG. 2 is a schematic perspective view of a preferred embodiment of a biaxial actuator for an optical pickup according to the present invention.
Figure 3:
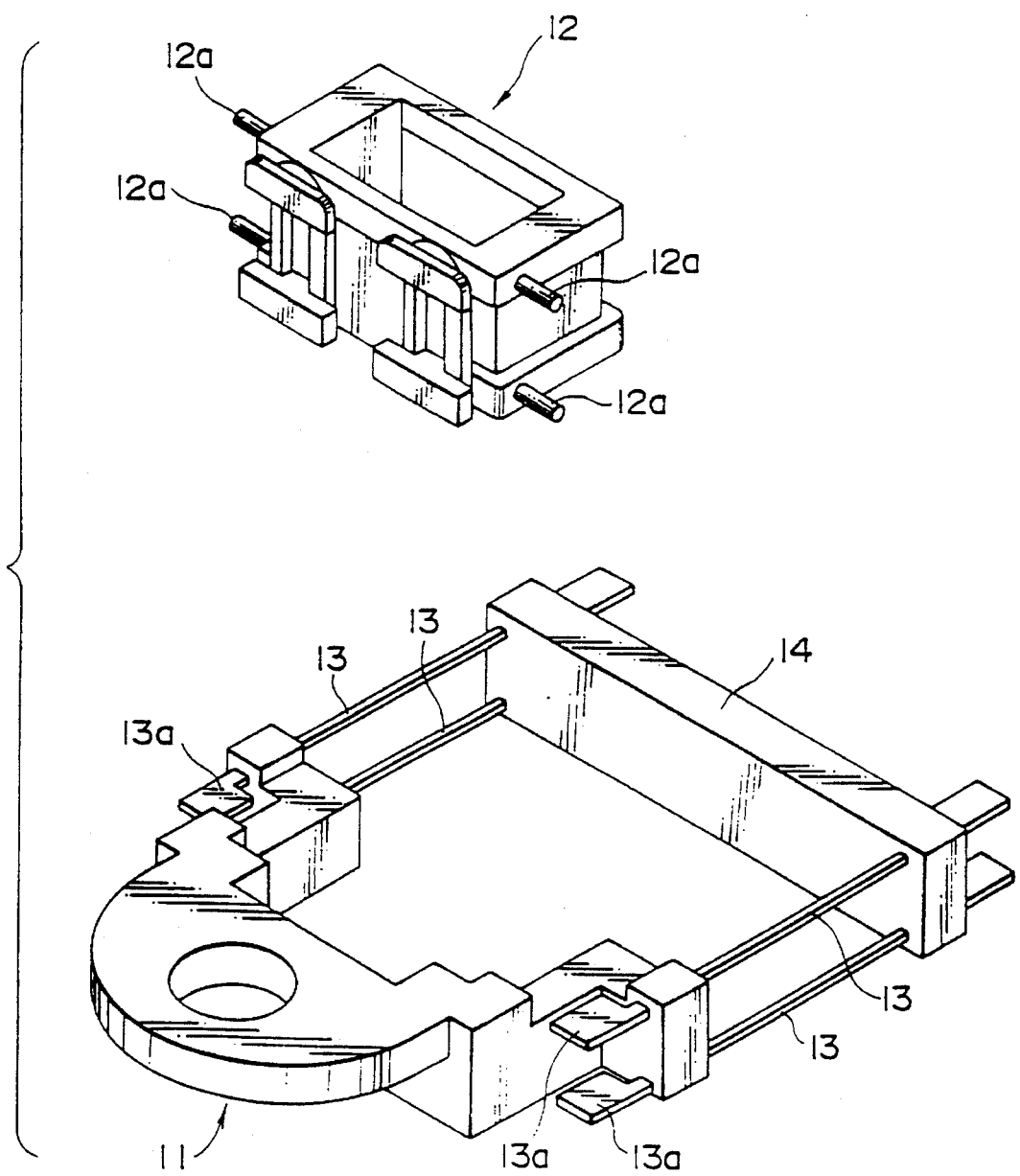
FIG. 3 is an exploded perspective view of the biaxial actuator shown in FIG. 2, showing a condition where a coil bobbin is removed from a lens holder.

Referring to FIG. 2, reference numeral 10 generally denotes a biaxial actuator for an optical pickup according to the preferred embodiment. The biaxial actuator 10 includes a lens holder 11, a coil bobbin 12 mounted on the lens holder 11, four leaf springs 13 as elastic members formed of phosphor bronze or the like and having first ends for supporting the lens holder 11, and a supporting portion 14 for fixedly supporting second ends of the leaf springs 13 to a base member or the like as a fixed member (not shown).

As shown in FIG. 2, the lens holder 11 is integrally formed with the four leaf springs 13 each having an elongated shape by outsert molding or the like from PPS, polycarbonate, etc.

The supporting portion 14 formed at the second ends of the leaf springs 13 is fixedly mounted to the base member, so that the lens holder 11 is supported so as to be movable in a tracking direction shown by an arrow A and a focusing direction shown by an arrow B.

A focusing coil and a tracking coil (both not shown) are wound around the coil bobbin 12. Wire ends of the focusing coil and the tracking coil are wound around four terminal pins 12a projecting from a side surface of the coil bobbin 12.

The winding of the coils around the coil bobbin 12 and the winding of the wire ends of the coils around the terminal pins 12a can be automated as similar to the prior art.

When the coil bobbin 12 is set in position with respect to the lens holder 11 in an assembling work, the four terminal pins 12a of the coil bobbin 12 come into contact with four enlarged end portions 13a of the leaf springs 13, respectively, which are integrally formed with the lens holder 11 as mentioned above.

In this condition, the terminal pins 12a are soldered to the enlarged end portions 13a, thereby fixedly retaining the coil bobbin 12 to the lens holder 11 and simultaneously electrically connecting the coils wound around the coil bobbin 12 through the terminal pins 12a and the leaf springs 13 to the supporting portion 14.

The soldering of the terminal pins 12a of the coil bobbin 12 to the enlarged end portions 13a of the leaf springs 13 can be automated.

The supporting portion 14 is integrally formed with the leaf springs 13 by outsert molding or the like at the same time of forming the lens holder 11. Thus, as shown in FIG. 3, the lens holder 11 and the supporting portion 14 are integrally formed with the leaf springs 13 by outsert molding or the like, so that the formation of these elements can be automated.

In manufacturing the biaxial actuator 10 having the above construction, the lens holder 11 and the supporting portion 14 are first integrally formed with the leaf springs 13 by outsert molding.

Then, the coil bobbin 12 around which the coils are preliminarily wound is set in position with respect to the lens holder 11, and the terminal pins 12a of the coil bobbin 12 are soldered to the enlarged end portions 13a of the leaf springs 13.

Accordingly, the coils wound around the coil bobbin 12 are led from the terminal pins 12a through the leaf springs 13 to the supporting portion 14 to be fixed to the base member.

In the biaxial actuator 10 mentioned above, supply of electric current to the coils is effected through the leaf springs 13, thereby preventing disconnection. Further, all the manufacturing steps are automated to shorten an assembling time and simplify the assembling work.

As described above, according to the preferred embodiment, the coils wound around the coil bobbin 12 are directly electrically connected from the terminal pins 12a of the coil bobbin 12 through the elastic members 13 to the supporting portion 14 fixedly mounted to the fixed member. Accordingly, no wiring from the terminal pins 12a to the fixed member is necessary. Further, the mounting of the coil bobbin 12 is effected by soldering the terminal pins 12a of the coil bobbin 12 to the elastic members 13. Accordingly, no adhesive or the like for fixedly mounting the coil bobbin 12 to the lens holder 11 is necessary, and so the assembling work can be easily performed.

In this preferred embodiment, the elastic members 13 are leaf springs, and the end portions of the leaf springs 13 to be connected with the terminal pins 12a of the coil bobbin 12 are expanded in area. Accordingly, the soldering of the terminal pins 12a to the elastic members 13 can be easily performed to thereby improve the workability.

Further, the lens holder 11 and the supporting portion 14 to be fixed to the fixed member are integrally formed with the elastic members 13 by outsert molding. Accordingly, the assembling of the elastic members 13, the lens holder 11 and the supporting portion 14 can be performed by a single molding step to thereby further simplify the assembling work.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. An objective lens driving actuator for moving an objective lens in a focusing direction and a tracking direction relative to a recording medium, comprising:

a movable portion for holding said objective lens;

a coil bobbin mounted on said movable portion and supporting a focusing coil and a tracking coil wound therearound, said coil bobbin having a plurality of terminal pins to which wire ends of said focusing coil and said tracking coil are connected;

a plurality of electrically-conductive elastic members for movably supporting said movable portion, said electrically-conductive elastic members being substantially parallel and having enlarged first ends for supplying power to said focusing coil and said tracking coil, said terminal pins of said coil bobbin being directly connected to said enlarged first ends of said electrically-conductive elastic members; and a supporting portion for fixedly supporting second ends of said elastic members to a fixed member.

2. The objective lens driving actuator according to claim 1, wherein said electrically-conductive elastic members comprise leaf springs.

3. The objective lens driving actuator according to claim 2, wherein said leaf springs have area enlarged portions to which said terminal pins are directly connected.

4. The objective lens driving actuator according to claim 1, wherein said movable portion and said supporting portion are integrally formed with said elastic members by outsert molding.

5. The objective lens driving actuator according to claim 1 wherein said elastic members are formed of phosphor bronze or the like.

6. The objective lens driving actuator according to claim 1 wherein said movable portion is supported by said elastic members and said supporting portion so as to be movable in a tracking direction and a focusing direction, each of which is substantially perpendicular to said elastic members.

7. The objective lens driving actuator according to claim 6 wherein said terminal pins of said coil bobbin project from a side surface of the coil bobbin in a direction substantially perpendicular to said elastic members.

8. A biaxial actuator for an optical pickup, comprising:

a lens holder;

a coil bobbin mounted on the lens holder and supporting a focusing coil and a tracking coil wound therearound, said coil bobbin having a plurality of terminal pins to which wire ends of said focusing coil and said tracking coil are connected;

a plurality of leaf springs integrally formed with said lens holder, said leaf springs respectively having an elongated shape and acting as elastic members formed of an electrically conductive material and having first ends for supporting the lens holder; and a supporting portion for fixedly supporting second ends of the leaf springs to a fixed member so that the lens holder is supported so as to be movable in a tracking direction and a focusing direction each of which is substantially perpendicular to said elongated leaf springs.

9. The biaxial actuator according to claim 8, wherein said electrically-conductive leaf springs are arranged in a substantially parallel manner.

10. The biaxial actuator according to claim 9, wherein said leaf springs have area enlarged portions to which said terminal pins are directly connected.

11. The biaxial actuator according to claim 8, wherein said lens holder and said supporting portion are integrally formed with said elastic members by outsert molding.

12. The biaxial actuator according to claim 8, wherein said elastic members are formed of phosphor bronze or the like.

13. A method of making a biaxial actuator for an optical pickup of a type comprising: a lens holder; a coil bobbin mounted on the lens holder and supporting a focusing coil and a tracking coil wound therearound, said coil bobbin having a plurality of terminal pins to which wire ends of said focusing coil and said tracking coil are connected; a plurality of leaf springs integrally formed with said lens holder, said leaf springs respectively having an elongated shape acting as elastic members formed of an electrically conductive material and having enlarged first ends for supporting the lens holder; and a supporting portion for fixedly supporting second ends of the leaf springs to a fixed member so that the lens holder is supported so as to be movable in a tracking direction and a focusing direction each of which is substantially perpendicular to said elongated leaf springs, comprising the steps of:

forming the lens holder and the supporting portion with the leaf springs by outsert molding;

setting the coil bobbin around which the coils are preliminarily wound in position with respect to the lens holder; and securing the terminal pins of the coil bobbin by soldering to the enlarged first ends of the leaf springs, whereupon the coils wound around the coil bobbin are led from the terminal pins through the leaf springs to the supporting portion to be fixed to a base member so that electric current to the coils is effected through the leaf springs.

14. The method of making a biaxial actuator according to claim 13, further including the step of arranging said electrically-conductive leaf springs in a substantially parallel manner.

15. The method of making a biaxial actuator according to claim 13, further including the step of connecting said enlarged first ends of said leaf springs directly to said terminal pins.

16. The method of making a biaxial actuator according to claim 13, further including the step of integrally forming said lens holder and said supporting portion with said elastic members by outsert molding.

17. The method of making a biaxial actuator according to claim 13, wherein said elastic members are formed of phosphor bronze or the like.

18. The method of making a biaxial actuator according to claim 13, further including the step of supporting said lens holder by said elastic members and said supporting portion so as to be movable in a tracking direction and a focusing direction, each of which is substantially perpendicular to said elastic members.

19. The method of making a biaxial actuator according to claim 13, wherein said terminal pins of said coil bobbin project from a side surface of the coil bobbin in a direction substantially perpendicular to said elastic members.

* * * * *